United States Patent
Melvin et al.

(10) Patent No.: US 10,089,989 B2
(45) Date of Patent: Oct. 2, 2018

(54) METHOD AND APPARATUS FOR A LOW POWER VOICE TRIGGER DEVICE

(71) Applicant: SEMICONDUCTOR COMPONENTS INDUSTRIES, LLC, Phoenix, AZ (US)

(72) Inventors: Mark Melvin, Waterloo (CA); Robert L. Brennan, Kitchener (CA)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 64 days.

(21) Appl. No.: 15/148,111

(22) Filed: May 6, 2016

(65) Prior Publication Data
US 2017/0162205 A1     Jun. 8, 2017

Related U.S. Application Data

(60) Provisional application No. 62/264,150, filed on Dec. 7, 2015.

(51) Int. Cl.
| | |
|---|---|
| G10L 15/00 | (2013.01) |
| G10L 15/26 | (2006.01) |
| G10L 25/00 | (2013.01) |
| G10L 17/06 | (2013.01) |
| G10L 25/24 | (2013.01) |
| G10L 25/78 | (2013.01) |
| G10L 17/22 | (2013.01) |

(Continued)

(52) U.S. Cl.
CPC ............. *G10L 17/06* (2013.01); *G10L 15/10* (2013.01); *G10L 17/04* (2013.01); *G10L 17/22* (2013.01); *G10L 25/24* (2013.01); *G10L 25/78* (2013.01); *G10L 2015/088* (2013.01); *G10L 2025/783* (2013.01)

(58) Field of Classification Search
CPC ... G10L 15/12; G10L 2015/088; G10L 17/04; G10L 25/78; G10L 15/26; G10L 2015/085; H04M 1/271; H04M 2201/40
USPC ................ 704/231, 235, 241, 246, 251, 252
See application file for complete search history.

(56) References Cited

U.S. PATENT DOCUMENTS 4,592,086 A * 5/1986 Watari .................... G10L 15/12
704/238
5,704,004 A    12/1997 Li et al.
(Continued)

FOREIGN PATENT DOCUMENTS

WO     00/60577     10/2000

OTHER PUBLICATIONS

Virtanen, "Speech recognition using factorial hidden Markov models for separation in the feature space." 2006, In Interspeech. 2006. pp. 1-4.*

(Continued)

*Primary Examiner* — Olujimi Adesanya
(74) *Attorney, Agent, or Firm* — Robert F. Hightower

(57) ABSTRACT

Aspects of the present disclosure involve a method for a voice trigger device that can be used to interrupt an externally connected system. The current disclosure also presents the architecture for the voice trigger device used for searching and matching an audio signature with a reference signature. In one embodiment a reverse matching mechanism is performed. In another embodiment, the reverse search and match operation is performed using an exponential normalization technique.

18 Claims, 7 Drawing Sheets

(51) Int. Cl.
*G10L 17/04* (2013.01)
*G10L 15/10* (2006.01)
*G10L 15/08* (2006.01)

(56) References Cited

U.S. PATENT DOCUMENTS

| | | | | |
|---|---|---|---|---|
| 6,067,520 | A * | 5/2000 | Lee | G10L 15/144 |
| | | | | 704/231 |
| 6,226,610 | B1 * | 5/2001 | Keiller | G10L 15/08 |
| | | | | 704/238 |
| 6,236,731 | B1 | 5/2001 | Brennan et al. | |
| 6,249,761 | B1 | 6/2001 | Phillips et al. | |
| 6,675,144 | B1 | 1/2004 | Tucker et al. | |
| 6,721,698 | B1 | 4/2004 | Hariharan et al. | |
| 6,983,246 | B2 * | 1/2006 | Kepuska | G10L 15/12 |
| | | | | 704/241 |
| 7,085,717 | B2 * | 8/2006 | Kepuska | G10L 15/12 |
| | | | | 704/241 |
| 7,139,707 | B2 | 11/2006 | Sheikhzadeh-Nadjar et al. | |
| 2002/0032566 | A1 * | 3/2002 | Tzirkel-Hancock | G10L 15/12 |
| | | | | 704/241 |
| 2002/0111802 | A1 * | 8/2002 | Ikeda | G10L 15/04 |
| | | | | 704/231 |
| 2003/0110033 | A1 * | 6/2003 | Sheikhzadeh-Nadjar | |
| | | | | G10L 15/34 |
| | | | | 704/243 |
| 2003/0220789 | A1 * | 11/2003 | Kepuska | G10L 15/12 |
| | | | | 704/238 |
| 2003/0220790 | A1 * | 11/2003 | Kepuska | G10L 15/12 |
| | | | | 704/241 |
| 2004/0199381 | A1 * | 10/2004 | Sorin | G10L 15/02 |
| | | | | 704/207 |
| 2009/0271182 | A1 * | 10/2009 | Athineos | G10L 15/02 |
| | | | | 704/205 |

OTHER PUBLICATIONS

Zehetner et al, "Wake-up-word spotting for mobile systems," Sep. 2014, 22nd European Signal Processing Conference (EUSIPCO), Lisbon, 2014, pp. 1472-1476.*

Deligne, S. et al., Low-Resource Speech Recognition of 500-Word Vocabularies, IBM Watson Research Center, Yorktown Heights, NY 10598, printz@us.ibm.com, 1-4, 2001.

Moreno, F. et al., A Flexible Architecture for Real-Time Speech Recognition, Microprocessing and Microprogramming, 37(1-5): 69-72, 1993.

* cited by examiner

METHOD AND APPARATUS FOR A LOW POWER VOICE TRIGGER DEVICE

CROSS-REFERENCE TO RELATED APPLICATION

This application claims priority to U.S. Provisional Application No. 62/264,150, filed on Dec. 7, 2015, entitled "METHOD AND APPARATUS FOR A LOW POWER VOICE TRIGGER DEVICE," invented by Mark Melvin and Robert L. Brennan, and is incorporated herein by reference and priority thereto for common subject matter is hereby claimed.

TECHNICAL FIELD

This disclosure relates generally to a voice trigger device.

BACKGROUND

The use of voice trigger commands is becoming increasingly popular as smartphones and wearables are being programmed to accept voice commands. Devices with such technology may require the use of an always-on, always-listening voice trigger device to wake up and perform the voice commands. Some existing solutions using voice trigger functionality are computationally complex, inefficient and resource-hungry.

DETAILED DESCRIPTION

Aspects of the present disclosure involve systems, methods, devices and the like for a voice trigger device. In one embodiment, a reverse search mechanism is used for trigger sequence search and match against a training sequence. Reverse search mechanism is a search and match technique that is introduced where the training sequence is stored in reverse order. In another embodiment, the trigger sequence can be matched and buffered on a word by word basis. By storing and comparing the training sequence in reverse order, a matching trigger sequence may be identified with less complexity while using an exponential normalization technique.

Figure 1:
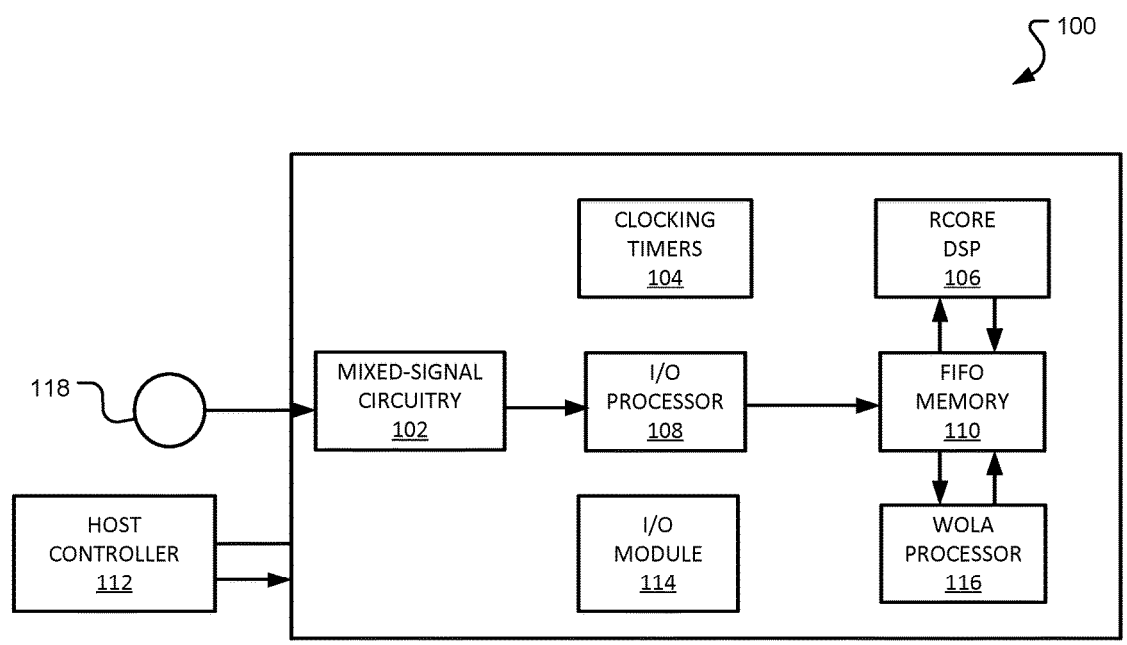
FIG. 1 is a diagram illustrating an exemplary architecture of a voice trigger device.

Electronic devices using hands-free voice activation generally use speech recognizers. Speech recognizers, however, are extremely processor intensive and require large databases. As an alternative, FIG. 1 illustrates an exemplary low power, mixed signal architecture of a speech recognizer (voice trigger device 100) which instead performs pattern recognition. By matching an audio pattern (e.g., trigger sequence) to a known reference pattern (e.g., training sequence) using the low-power, mixed signal architecture, the required database for speech recognition is eliminated and instead a less costly system is available for the voice trigger device.

In FIG. 1, the voice trigger device 100 takes advantage of both analog and digital signal processing by implementing three processors which may operate in parallel (e.g., RCore digital signal processor (DSP) 106, input/output (I/O) processor 108, weighted overlap-add (WOLA) processor 116) and can work coherently as a system on a chip (SoC). The mixed signal nature of the combined SoC also permits the use of both analog and digital microphones 118, decreasing both cost and power consumption. Note that the processors can be any general DSPs and in particular the RCore processor can be any general DSP and not limited to the use of an RCore.

In voice trigger device 100, audio signals are captured by microphone 118, conditioned by mixed-signal circuitry 102 and transferred to first in, first out (FIFO) memory 110 by the I/O processor 108. Mixed signal circuitry 102 is a component that can be used to condition audio signals received by the microphone 118 and processed by the I/O processor 108. In one instance where the analog microphone is used, the mixed-signal circuitry 102 can include one or more of an analog amplifier, an analog-to-digital converter and a decimation filter. In the other instance where a digital microphone is used, the mixed-signal circuitry can include at least a decimation filter.

The audio signals can be in the form of words, whistles, claps, and other audio noise that can be used to train the voice trigger device 100. The FIFO memory 110 is a memory buffer that can be used to store raw audio samples as the audio signals are captured by the microphone 118. The FIFO memory 110 can also be a circular buffer that collects blocks (e.g., frames) of samples for further processing by the WOLA processor 116 and the RCore DSP 106. The FIFO memory 110 can also be a dynamic storage device, a random access memory (RAM) or other computer-readable devices coupled to a processor bus for storing information and instructions to be executed by the processors 116, 106. A breakdown of the data buffering is described below and in conjunction with FIGS. 4A and 4B.

The I/O Processor 108 is a processor that can be used to transfer the data to memory (i.e., FIFO memory 110) as it arrives from the external I/O devices (e.g., microphone 118) to be processed by a central processor (e.g., WOLA processor 116, RCore DSP 106). The I/O Processor 108 can work jointly with an I/O module 114, which can include at least the control port and general purpose I/O to realize the open ended communication between devices (e.g., communications with the host controller 112) at the embedded level. The host controller 112 is used to send control and configuration commands to and from the voice trigger device 100. The host controller 112 may be the device that is being "woken up" by the voice trigger device 100 via a general purpose I/O signal (e.g., a wake-up signal). Note that one or more host controllers 112 may be connected to the voice trigger device 100 and, in some instances, other devices may be connected to the voice trigger device. In addition or alternatively, the other devices may be "woken up" as well.

Once the audio signals have been sampled and stored in FIFO memory 110, the data can be accessed by the central processing units 106,116. The RCore DSP 106 is a processing unit that can be responsible for a large part of the signal processing as it corresponds to recording, searching and matching the captured audio signature and the reference signature. For example, the RCore DSP 106 can be responsible for performing distance and energy binning computations as may be required in identifying a match. In addition, the RCore DSP 106 can be used to determine if speech is present for identification. The RCore DSP 106 can work jointly with the WOLA processor 116. The WOLA processor 116 may be a filterbank co-processor that can be used to efficiently compute discrete convolutions using a weighted overlap-add method. Specifics on the processing performed by the processors 108, 106, 116 are described below and in conjunction with the processor loading diagram of FIG. 3. To maintain the voice trigger device 100 working in synchrony, clock timers 104 are included. The clock signal from the clock timers 104 can be a signal that oscillates between high and low states to keep the actions coordinated and signals within the voice trigger device working in synchrony.

As indicated, a voice trigger device 100 can be configured to "wake-up" an external host controller 112 based on a captured audio signal (e.g., trigger sequence) matching a stored reference signal (e.g., training sequence). As such, a plurality of processors can exist that operate in parallel or sequentially to receive, sample, and process the audio signal for pattern matching. Shared memory in the form of a circular buffer (e.g., FIFO memory 110, circular trigger buffer 410 of FIG. 4A) can exist to support the matching operation. The purpose is to provide real-time audio recognition for use with a voice command operated device, where the device can include a voice trigger device. The voice trigger device 100 can exist in various devices that can be operated by a voice command such as, but not limited to, a smart phone, a "wearable," a thermostat, a digital speaker assistant, a tablet, etc.

The voice trigger device 100 can work by matching the trigger sequence with a reference signature/training sequence recorded during the training phase. Therefore, the voice trigger device 100 is designed to receive a reference signature which can be used as the basis for waking up the voice trigger device 100. The reference signature can be in the form of an audio pattern (e.g., spoken word or phrase, clap, whistle, bang, etc.) that is stored and used to compare with incoming trigger sequence. The reference signature can be used as a training sequence that is set when initializing the voice trigger device 100. For example, the training sequence can be a simple "wake-up phone," that is spoken, sampled and stored for later use when using voice commands on the phone. The training sequence may be repeated one or more times in order to obtain various sequences to have for comparison when the trigger sequence is received.

Figure 2:
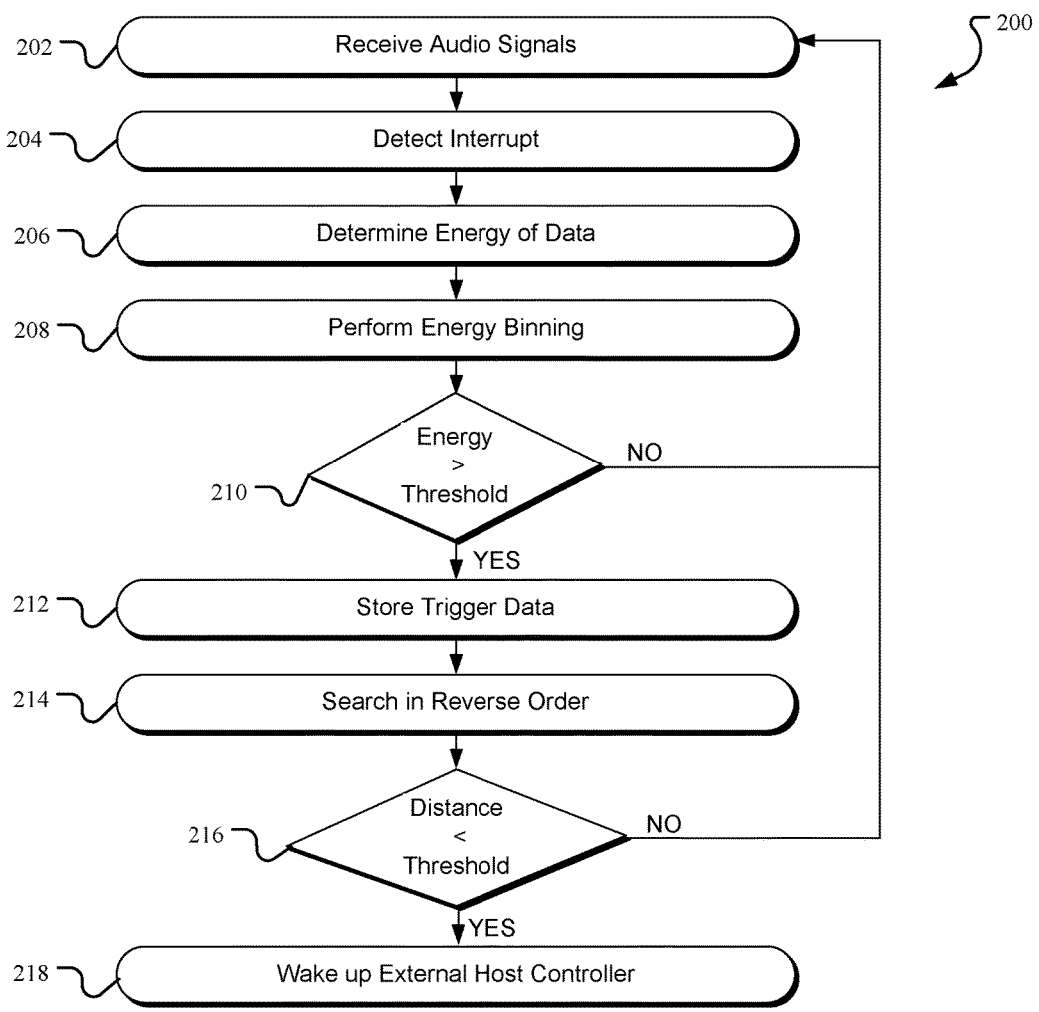
FIG. 2 is a flowchart of a method for recognizing a voice trigger in a voice trigger device.

The voice trigger device 100 can be an ultra-low power device as it is always-on and always-listening for the trigger phrase. Once the training sequence is stored, the voice trigger device 100 is ready and listening for a trigger sequence that mimics the training sequence. The method 200 for "waking" the host controller 112 is illustrated in FIG. 2. Specifically, FIG. 2 is a flowchart of a method 200 for recognizing a voice trigger in a voice trigger device 100. The first step in method 200 begins with operation 202, where an audio signal is received. The audio signal can be any audio pattern including spoken word or phrase, clap, whistle, bang, etc., which is received by the voice trigger device 100. The audio signals are received at microphone 118 and processed by the I/O processor 108 as indicated above for storage into the FIFO memory 110. The block of samples received are stored in the FIFO memory 110, and may be continuously and circularly buffered. When a block of samples (e.g., a frame) has been collected, the pointers related to the FIFO memory 110 are shifted by one frame. The shift triggers an interrupt to be generated, in operation 204, to indicate that a block of samples are ready for further processing by the other processors 106, 116 in the voice trigger device 100.

The interrupt triggered in operation 204 then prompts the start of data processing at the WOLA processor 116. The WOLA processor 116 can be a filterbank that is used to perform windowing operations, Oversampled Filterbank Analysis (OFBA) using the Weighted Overlap-Add (WOLA) method, for Fast Fourier Transform (FFT) computations and vector multiplications. In other words, the WOLA processor 116 can be used as a processor that applies a window to the received time-domain samples and translates them into the frequency domain. The WOLA processor 116 also calculates the squared energy by squaring the absolute value of the data received, as indicated in operation 206. The data is then further processed for later comparison against a threshold to determine if the block of samples received contains speech that needs to be compared against the training sequence to wake up the voice trigger device 100.

Once the squared energy of the data has been computed, the data can be further manipulated by the RCore processor 106. The RCore processor 106, as will be evident in FIG. 3, performs various functions that may ultimately be used for waking up the external host controller 112. For example, once the squared energy has been computed, intermediate data manipulation can be computed by the RCore processor 106, which prepares the data for further gain analysis, which can be calculated in parallel by the WOLA processor 116. Subsequently, the RCore processor 106 uses the resulting energy data computed by the WOLA processor 116 to perform energy summing (binning), as performed by operation 208 of method 200. Energy binning is an important factor that can be used to determine whether speech is present. If speech is present, then search and match against the training sequence may be desired. Energy binning can be regarded as consolidating groups of energy bands into discrete bins, and can include taking the logarithm of the calculated energy bins. The process of energy binning is a key factor in determining Mel-Frequency Cepstrum Coefficients (MFCCs).

With the energy binning completed, a voice activity detector (VAD) is used to make the determination regarding the presence of speech or other audio trigger, as indicated in operation 210. The VAD is a state machine that uses the energy results combined with a set of thresholds to determine if there is any speech present. Therefore, in operation 210 if the energy is less than the threshold, no speech is present and the method returns to operation 202, where the voice trigger device 100 receives more audio signals for comparison. On the contrary, if in operation 210 the energy is greater than the pre-defined threshold, then speech is present and method 200 proceeds to operation 212, where the trigger phrase is stored. Once the end of speech is detected, then method 200 continues to operation 214, where a search is performed for a match in reverse order. As a result of the reverse search operation, a distance is computed which is used in operation 216. If the distance computed is greater than a pre-determined threshold, then no match is observed. If no match observed, the method 200 returns to operation 202, where the voice trigger device 100 receives more audio signals for comparison. Note that additional audio signals may also be received in parallel while the decision of operation 216 is occurring. Alternatively, if the distance computed in operation 216 is less than the predetermined threshold, a match exists between the speech received and the training sequence. Thus, in operation 218, the wake-up pin of the voice trigger device 100 is enabled and the external host controller 212 is "woken up".

Figure 3:
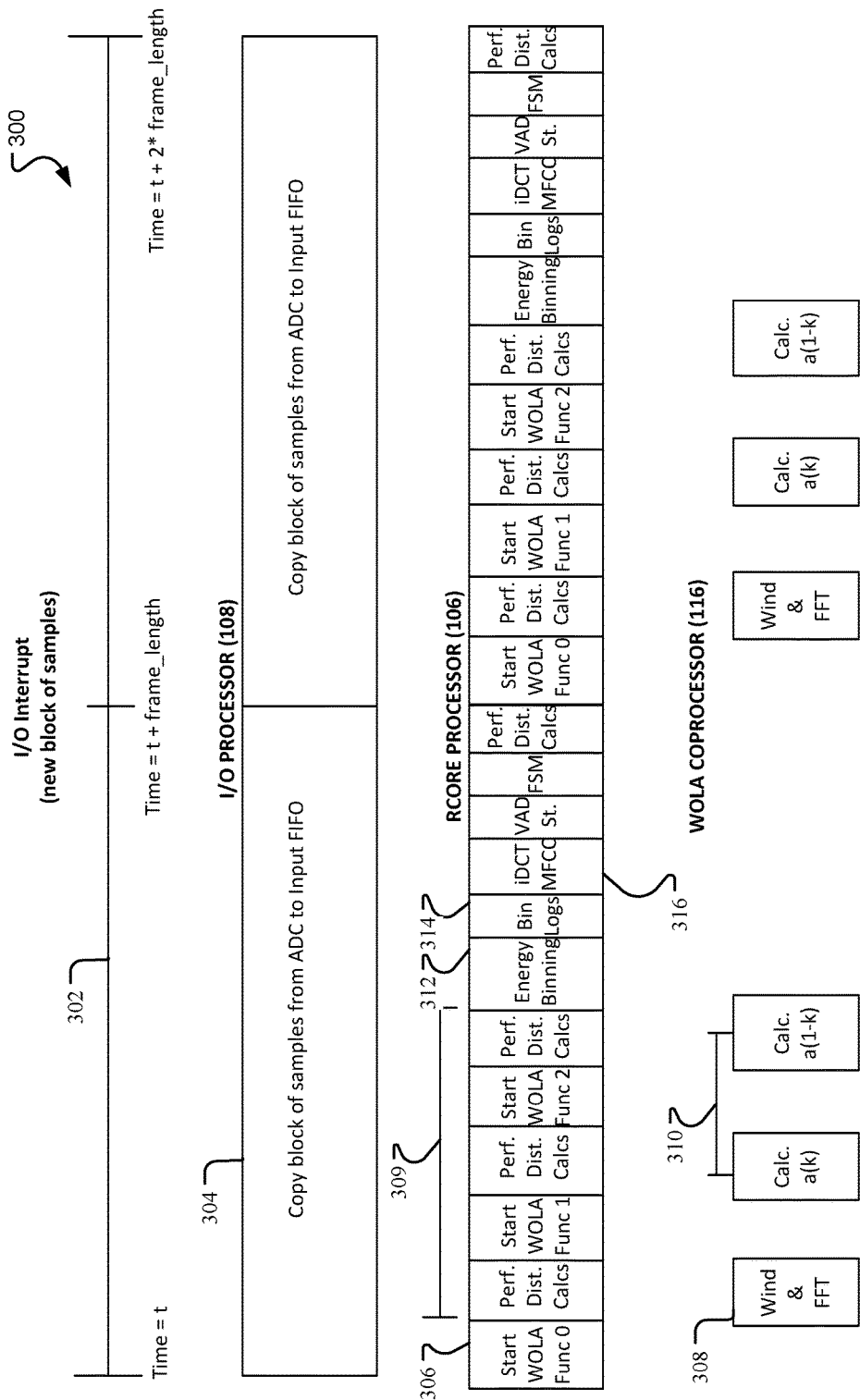
FIG. 3 is a diagram illustrating processor loading during a trigger data search and match in a voice trigger device.

Turning to FIG. 3, processor loading is illustrated as it applies to search and match for trigger data in the voice trigger device 100. Illustrated in FIG. 3 are the three processors: I/O processor 108, RCore processor 106, and WOLA processor 116. Further illustrated are the processes that take place in method 200 for recognizing a voice trigger. Two blocks of samples are illustrated by the I/O interrupt time line 302 and identified by the triggered interrupt as detected in operation 204. Data buffering begins at the I/O processor 108, where audio signals are received and transferred to a circular buffer of raw audio samples through the use of an analog to digital converter (ADC). The input FIFO memory 110 receives the block of samples from the I/O processor 108 and continuously buffers the data circularly. When a block of samples is collected, the pointers related to the input FIFO data are shifted by one frame (block of samples) for further processing in the system.

As the input FIFO data is shifted, the RCore processor 106 receives the interrupt to begin processing. RCore processor 106 maintains a state machine that tracks the state of the system. In addition, the RCore processor 106 interacts, in data loading 306, with the WOLA processor 116, which begins computing the WOLA operations. As indicated above, a WOLA processor 116 is a filterbank that is designed to manipulate the incoming data samples into information that can be used by the Voice Activity Detector to determine if speech is present. The Weighted Overlap-Add method is a signal processing technique used to efficiently evaluate a very long signal with a finite impulse response (FIR) filter. The WOLA processor 116 begins by applying a window to the received time-domain samples and translating them into the frequency domain as indicated in data loading 308. The samples then return to the RCore Processor 106 where the RCore processor 106 subsequently prepares the data 309 for the subsequent gain applications (in data loading 310) that are calculated in parallel by the WOLA processor 116. After the gains are applied, the RCore processor 106 performs binning and summing of the data results to reduce the number of bins used. For example, if the RCore processor 106 begins with 256 bins, energy binning (in data loading 312) can reduce the number of bins used to 18.

Figure 4A:
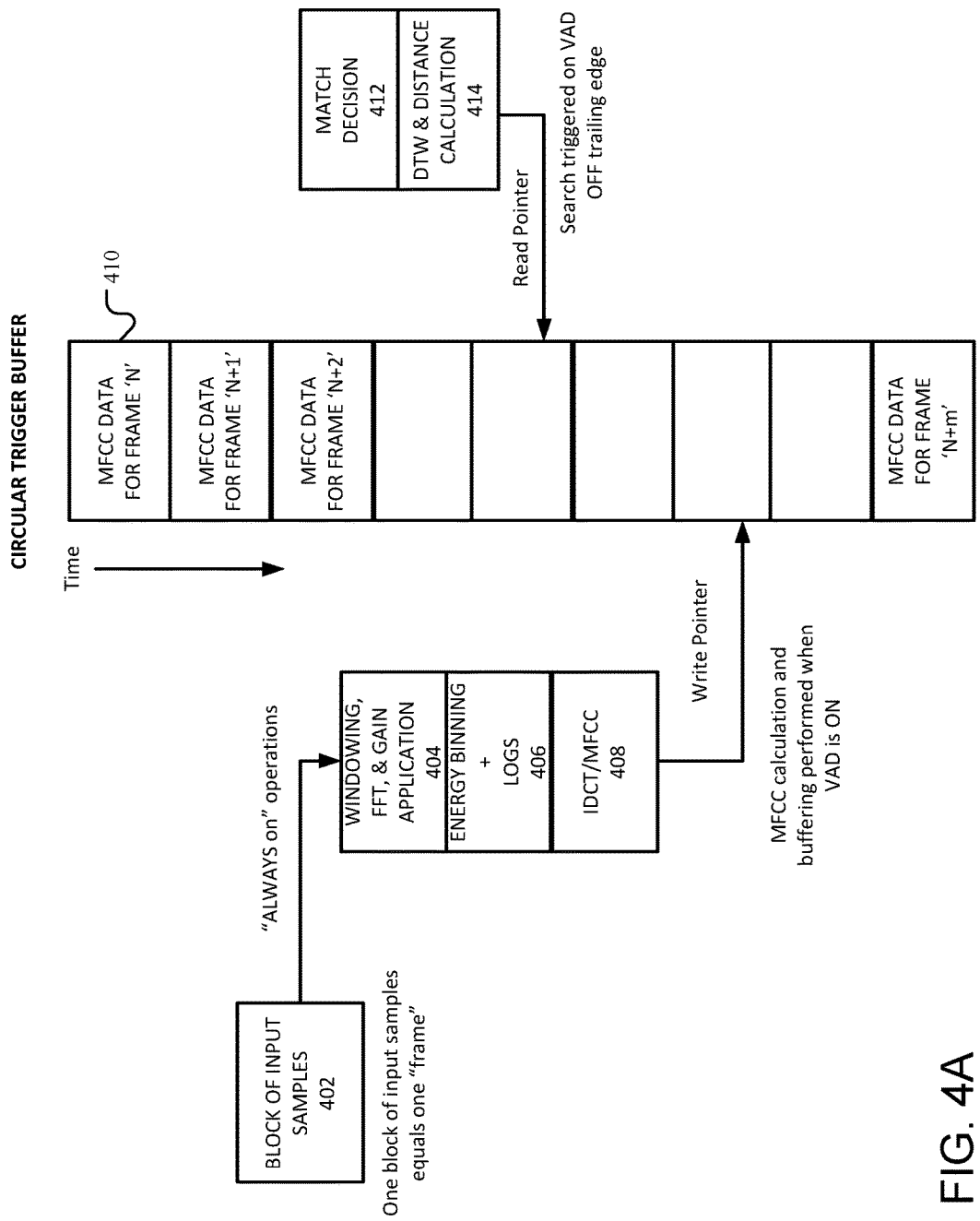
FIG. 4A is a diagram illustrating data buffering in a circular trigger buffer.

The RCore processor 106 then continues the data loading process by calculating the logarithm (log) of the energy bins in data loading 314. Once the bin logs are computed, the resulting data can be multiplied by discrete cosine coefficients to calculate the Mel-Frequency Cepstrum Coefficients (MFCCs) using inverse Discrete Cosine Transforms (iDCT) in 316. Mel-frequency cepstrum (MFC) is a technique used in computing MFCCs for recognizing features in a speech recognition system. MFCCs are the coefficients that define the MFC and can be used to represent the training sequence as a short-term power spectrum of sound. Similarly, for the incoming data, the MFCCs are used to represent the trigger sequence and can be stored in the circular trigger buffer, as illustrated in FIG. 4A.

Using the energy results as indicated in operation 208, the VAD is able to determine if speech is present. If it is determined that no speech is present, no MFCCs are buffered and the RCore processor 106 goes into a sleep state until the next interrupt is received from the I/O Processor 108 indicating that more samples are available. Alternatively, if speech is present, then the MFCCs computed by the RCore Processor 106 are used to determine if a search will be executed.

In order to remove any dependence on relative signal magnitude, normalization of the MFCC vector may be necessary. However, because multiple search operations are likely performed on overlapping data, fixed normalization techniques based on the subtraction of the mean vector (one mean value corresponding to each MFCC coefficient) from a captured buffer of MFCC data are not appropriate. Calculation of a new mean vector separately for each overlapping MFCC buffer is necessary; unfortunately, this calculation can be very computationally extensive. Therefore, exponential normalization based on a running sum is introduced as a solution that can be used for the calculation of a new mean vector separately while reducing complexity.

In this solution, the running sum of each MFCC component is computed as each frame is acquired, as opposed to calculating a mean vector based on a fixed buffer. To accomplish this computation, two snapshots of the running sum are necessary, one at the beginning and one at the end. Since the search is done backwards, the latest running sum snapshot is the current running sum and the beginning snapshot is determined from time locations when the VAD switches on in the past. A running timestamp is also included in the snapshot data so that the number of frames to be normalized are known. Using this approach, the mean vector can now be calculated using:

$$\text{mean vector} = \frac{\text{current snapshot vector} - \text{beginnining snapshot vector}}{\text{current timestamp} - \text{beginning timestamp}}$$

(This approach is detailed further below)

These snapshots and timestamp data may be stored as two's complement numbers so that if overflow occurs (negative and/or positive) the number stored will ignore the extra bits borrowed or carried out. When the subtraction is done, the correct values are obtained as long as a sufficient number of extra bits are used for the sums. The use of running sum normalization permits word by word search as the trigger sequence arrives at the circular buffer and also facilitates backward matching. Once loaded, a reverse search can be performed by searching for a match with the training sequence. If no match is detected, the buffer of data can be kept and the next search is performed. Note that although backward matching is described, forward matching is also possible using this approach.

In some instances, exponential normalization may be used in conjunction with the running sum technique to adjust the mean weighting to more heavily weight the latest MFCC contributions and more lightly weight the earliest MFCC contributions to the MFCC mean vector.

As indicated above, MFCCs can be used to represent the trigger sequence which can be compared to the training sequence. In implementing the running sum approach, the mean value is not subtracted from the buffer but is applied "on-the-fly" during the distance calculation. This way, the problem with overlapping data is reduced to finding an appropriate MFCC mean vector rather than keeping track of the different domains of the normalized MFCC data. For example, the indexing and normalizing of the data can be performed by taking into account the circular buffer, which can store up to N data samples. Assuming n represents the current time index, n−1 represents the previous index, and n−k represents the $k^{th}$ previous index, then the index can be interpreted as modulo-N and exponential sums denoted as s(n) and expressed by:

$$s(n) = \sum_{k=0}^{n} \alpha^{n-k} x(n-k)$$

$$s(n) = \alpha * s(n-1) + x(n)$$

For simplicity, this summation illustrates the calculation for only one mean component. In general, s(n) can be a vector with as many components as MFCC coefficients. To isolate the mean vector m(n), the beginning snapshot s(n−M) is subtracted from the latest snapshot s(n) and divided by the number of frames:

$$m(n) = \frac{s(n) - s(n-M)}{TS(n) - TS(n-M)}$$

where the denominator represents the cumulative time stamp with TS(n) representing the time stamp at the end, and TS(n−M) representing the time stamp at the beginning.

Note that α can be both real and complex. In addition, a may be one or less than one. When α equals one, the routine will use the running sum type with equal weight for all samples in the computation. Additionally or alternatively, when α is less than one, exponential weighting is employed. If a complex α is used, accuracy can be increased by extending the window to include trigonometric windows such as sin(x) and cos(x). Since exponential normalization is a known technique further details will be omitted. However, it should be noted that unique in the implementation is the use of exponential normalization for reverse matching which permits normalizing only when new data comes in.

$$m(n) = \frac{s(n) - \alpha^M s(n-M)}{TS(n) - TS(n-M)}$$

Once the end of a speech segment is detected, as indicated by the VAD, then the data processing continues by searching to see if the data currently in the trigger buffer is representative of the data in the training buffers (as indicated in operation 214 of method 200 in FIG. 2). Thus, it should be determined whether the trigger buffer is a close match to the training sequence/signature. To determine this, further signal processing is involved including the use of one or more algorithms (e.g., Hidden Markov Model (HMM), Dynamic Time Warping (DTW), etc.). In one embodiment, DTW may be used for pattern recognition. DTW is an algorithm that calculates the relative distance between two sequences of data. The sequences may vary in time and/or speed and the similarities between them can be measured using the DTW algorithm. DTW uses time warping to align any local distortions that may exist between the sequences. Therefore, DTW can be used to account for instances where two waveforms may not be identically aligned. For example, DTW can be used where the trigger sequence is repeated at a different speaking speed as compared to the training sequence. The result of the algorithm is a set of distance calculations (e.g., Euclidean distances) that can be compared to a threshold. The threshold and distance calculations are performed as indicated by operation 216 of method 200. The aforementioned matching process occurs in the trigger and training buffers as illustrated and described in conjunction with FIG. 4B.

A key feature in using the DTW algorithm is the ability to compare the trigger buffer data (e.g., trigger sequence) to the reference data (e.g., training sequence) in reverse time. By comparing the trigger buffer data to the reference data in reverse time, multiple words can be captured and a search can be performed after each word. In addition, the reverse time search allows the trigger sequence to be identified in mid-sentence without requiring a moving window to be applied as is generally required in time-forward direction searches. FIG. 5B provides details related to the reverse time search technique. As a match is identified, the voice trigger device 100 asserts a wake-up signal to the external host controller 112 as indicated in operation 218 of method 200.

Figure 4B:
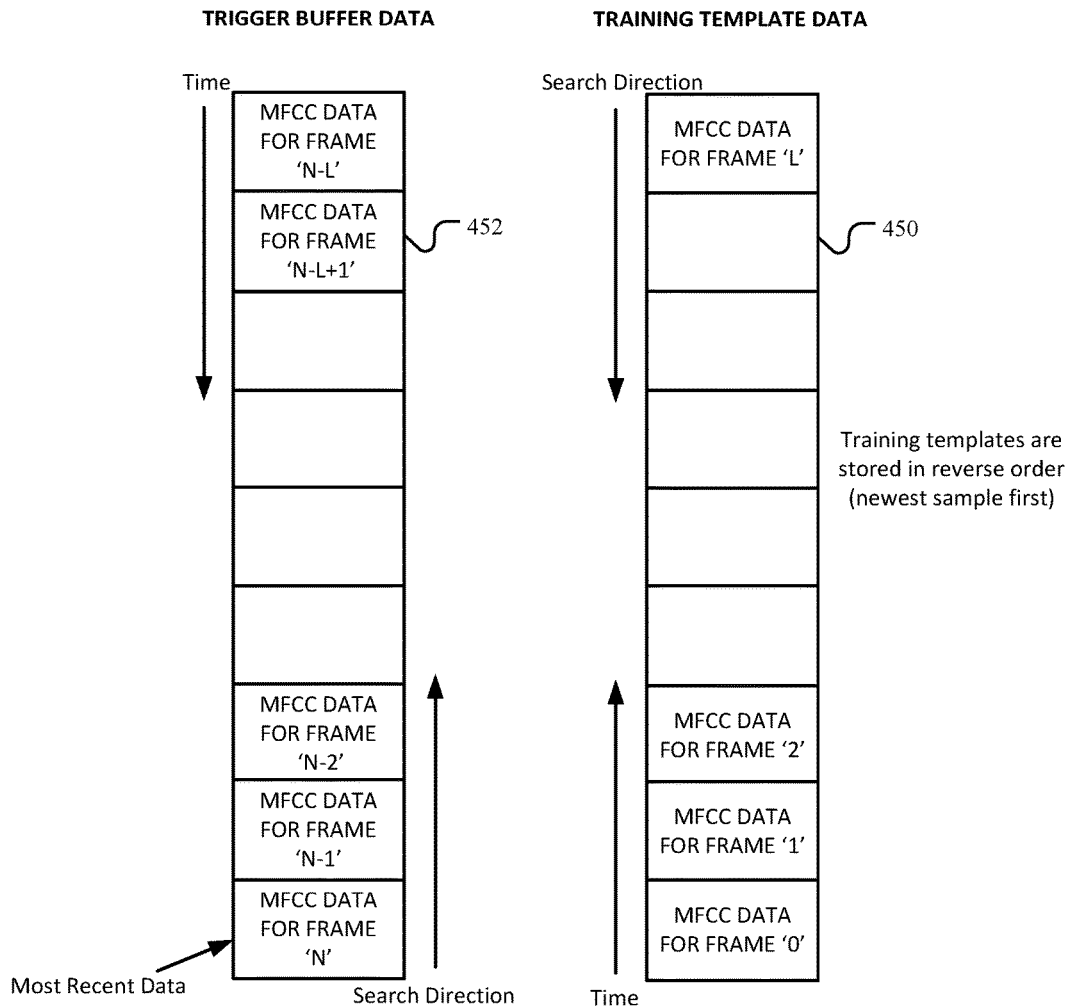
FIG. 4B is a diagram illustrating data buffering in training and trigger buffers.

FIG. 4A and FIG. 4B provide a close look at the buffering that occurs as a trigger sequence is received, searched and matched against the training sequence. Specifically, FIG. 4A describes data buffering in a circular trigger buffer as the audio signal is received by the I/O processor 108 and transferred to FIFO memory 110. As illustrated in FIG. 3, a block of samples are received. This is illustrated in FIG. 4A as received by equivalent Block of Input Samples 402. The receipt of the data triggers an interrupt that commences data processing at both WOLA Processor 116 and RCore Processor 106. The WOLA processor 116 takes the sampled data and begins processing the information to determine if speech is present. The data processing begins with the windowing, data transform to the frequency domain, and gain application 404. These functions are performed and subsequently followed by energy binning computations 406 in the RCore processor 106. Once energy (summing) binning is completed, then the energy logs are computed 406 in preparation for the MFCC computations 408 which will be used for distance comparison against the training sequence. Mel-Frequency Cepstrum Coefficients (MFCCs) is a technique for recognizing features in speech trigger system using inverse Discrete Cosine Transforms (iDCT) computations 408. MFCCs are the coefficients that define the MFC and can be used to represent the training sequence and the incoming trigger sequence as a short-term power spectrum of sound. The incoming data represented by the MFC coefficients can be stored in the circular trigger buffer 410. Data buffering in the circular trigger buffer 410 could occur in instances where the Voice Activity Detector would determine that speech was present for search and match against the training sequence (i.e., VAD is ON). In instances where the VAD determined no speech was present, the VAD would be OFF and no MFCC data would be copied to the trigger buffer. The trigger data, represented by the MFCCs is stored in chronological order over time, where frame N takes the first place in the buffer at a first time instance and as time passes, the next frame N+1 is stored. As long as the VAD is ON, the data continues to write through the circular trigger buffer to the MFCC data frame N+m stored in the last location where m is the number of frames available in the buffer, wrapping circularly and overwriting any previous data.

As data storage concludes (when the VAD turns OFF, indicating there is no speech present), data matching and distance calculations are performed to determine if a match exists against the training sequence. In the current embodiment, the data is read in the reverse direction. Dynamic Time Warping and distance calculations 414 are performed to account for instances where two waveforms may not be identically aligned and to determine if a match exists as the distance is compared to a pre-determined threshold. If the result of the match decision 412 is positive (the trigger buffer with the trigger sequence matches the training sequence), this status is indicated on the wake-up pin of the voice trigger device 100, waking up the connected external host controller 112. At this point the voice trigger device 100 goes to sleep until another interrupt is detected and the process repeats itself.

FIG. 4B is a diagram illustrating data buffering in training and trigger buffers. The training buffer is the memory space where the training sequence used to initialize the voice trigger device 100 may be stored. During this buffering, the voice trigger device 100 may have a separate mode of operation dedicated to collecting the training templates. In this mode, the operations may proceed in the same manner, however the search and match decision may not take place. This mode may be used to collect the MFCC reference data and store it in the training template memory area. As the training audio data is received by the I/O Processor 108, it will be stored in the FIFO memory 110. The RCore processor 106 and WOLA processor 116 perform calculations on the data in FIFO memory, and the training sequence will be stored using the MFCCs of the data (as a training template); an example technique is described in detail above and in conjunction with FIGS. 1-3. The training templates can then be stored in the training buffer in reverse order so that the newest samples are first. Therefore, the first MFCC data for frame "0" will take the first memory location; the next MFCC data for frame "1" will take the next, and so on. However, when a search is performed, the search direction will occur from the newest frame to the oldest as indicated by the search direction on the training template data buffer 450.

The voice trigger device 100 returns to general recognition mode, where the trigger sequence, once recognized by the VAD as speech being present, will also be manipulated into trigger buffer MFCC data. The data will be stored from latest (or most recent) to first as indicated by the time arrow on the trigger buffer data 452. However, to coincide with the direction of the training template, the trigger buffer data will be searched in the opposite direction as illustrated by the search direction on the trigger buffer data 452. FIG. 5B provides an illustration of the speech capture for both the trigger sequence and training sequence.

Figure 5A:
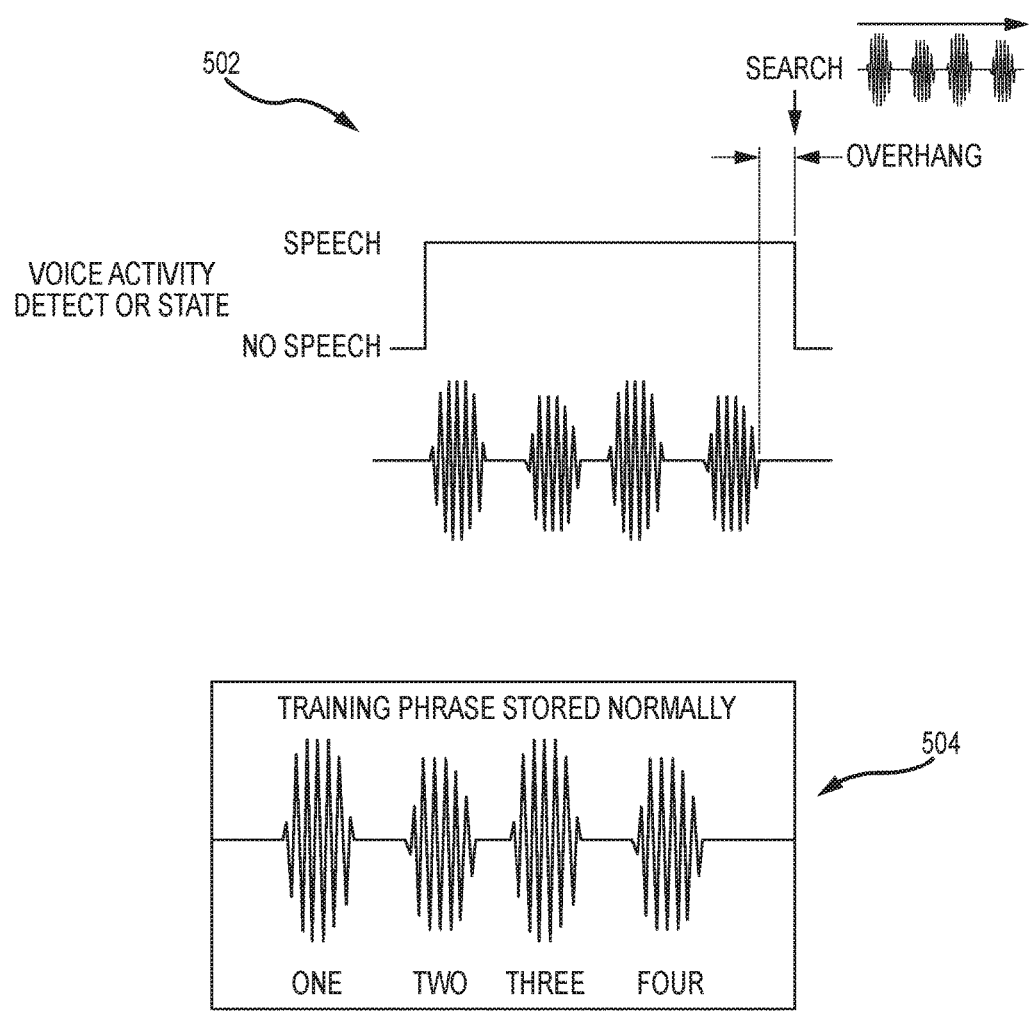
FIG. 5A is a diagram illustrating sequence capture in a voice trigger device using a forward search mechanism.
Figure 5B:
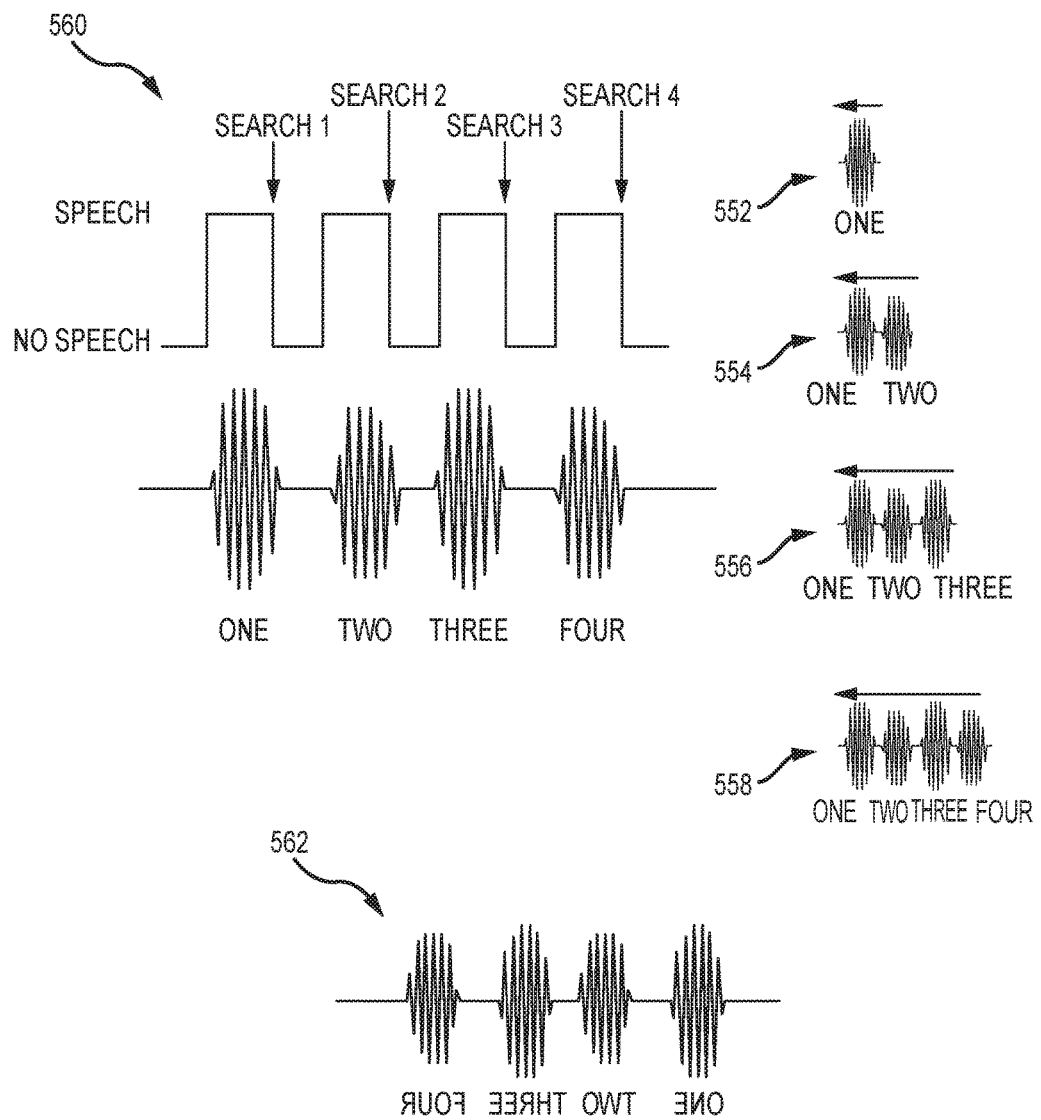
FIG. 5B is a diagram illustrating sequence capture in a voice trigger device using a reverse search mechanism.

FIGS. 5A and 5B provide an illustration of sequence capture in a voice trigger device. As has been explained, a method and apparatus for an ultra-low power, always-on voice trigger device is introduced. The method as explained in conjunction with FIG. 3 is designed to provide an illustration and description of how the voice trigger device is initialized and used for voice command performance. An embodiment in the voice trigger initialization is the use of a trigger sequence that is used to compare against a training sequence for voice trigger device wake up. FIGS. 5A and 5B provide a visual illustration of how the comparison/matching occurs using two distinct matching techniques.

In one embodiment, FIG. 5A provides a diagram illustrating pulse capture during a forward search. Forward search is a mechanism that provides the ability to search an entire buffer at a time. The entire buffer corresponds to a single VAD pulse. Therefore, in a forward search, the entire VAD pulse may be normalized, compared, and matched. A single search can be performed starting from the oldest buffer sample to the newest, moving forward in time. Speech capture 502, for example, illustrates the forward search technique where four speech pulses are received by the Voice Activity Detector. The pulses are normalized and searched in the order received as indicated by the arrow on the search phrase. Similarly, the training sequence that will be used to compare the trigger sequence received is stored in a forward manner. For example, if the training sequence is "one two three four," then using the forward mechanism, the incoming trigger sequence received 502 is also checked for a match on "one two three four." The overhang parameter as indicated in 502 is selected to ensure the VAD does not turn off in between two sufficiently adjacent speech pulses. In the single forward search an entire sentence/phrase may be searched without the ability to stop and search on a per-word basis or the ability to stop mid-sentence. Once the trigger buffer is searched, its entire contents may be discarded.

In the present embodiment, voice recognition can be performed using a "reverse" search mechanism. FIG. 5B provides a diagram illustrating the pulse capture during a reverse search. Again, speech is recognized by the VAD; however, in this instance the overhang parameter does not exist, or is set sufficiently small such that a search is performed after each word. For example, if the phrase is "one two three four," the MFCC data for the phrase is collected in forward order into the trigger buffer as indicated by phrase 560; however the trigger buffer is compared in reverse order, most recent data first, to the training buffers. Therefore, because the phrase is searched from last to first, the word "one" 552 is first searched for a match. Next, the phrase "one two" 554 is searched for a match and the phrase search continues for phrase "one two three" 556 and "one two three four" 558. Notice that using the reverse mechanism, the term may be searched multiple times (e.g., "one", "two", etc.), which is where exponential normalization may be a preferred technique. Searches are performed by iterating backwards from the newest to the oldest sample in the trigger buffer (moving backwards in time). Accordingly, the training sequence 562 is stored in reverse. By permitting word by word search in reverse order, the training sequence may be detected even if there is a pause between words, or if the trigger sequence is spoken in the middle of a sentence (is surrounded by non-trigger phrase words). The match decision logic is written such that the phrase is concluded to be a match and the search process stopped based on the current distance calculation result combined with the traversed length (in number of frames) before including any previous MFCC data that is present in the oldest locations of the trigger buffer that is not part of the trigger sequence. Once a match is declared, the entire trigger buffer can be discarded. Similarly, any buffered trigger sequence will be discarded after a sufficient timeout period with no speech present.

Note that the embodiments of the present disclosure include various operations or steps. The steps may be performed using information from hardware components, and may be embodied in hardware components or may be embodied in machine-executable instructions, which may be used to cause a general-purpose or special-purpose processor (e.g., a processing unit of device) executing the instructions to perform the steps. Alternatively, the steps may be performed by a combination of hardware, software and/or firmware.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method, comprising:
configuring a voice trigger circuit to:
receive a training sequence and store a representation of the training sequence in a training buffer in reverse of order received;
detect receipt of an audio signal that is sampled into blocks;
determine a plurality of energy values of the sampled audio signal blocks;
perform energy binning of the plurality of energy values to determine whether speech is present in the sampled audio signal blocks;
determine that speech is present in the sampled audio signal blocks received;
store a representation of the sampled audio signal block in a trigger buffer;
match the representation of the sampled audio signal blocks stored in the trigger buffer starting with the representation of most recently received sampled audio signal block and proceeding to oldest received sampled audio signal block, to the representation of the training sequence stored in the training buffer starting with the most recently received and proceeding to oldest received; and
enable a wake up pin in the voice trigger circuit upon matching the representation to the training sequence.

2. The method of claim 1, wherein the audio signal is received by a mixed signal component in the voice trigger device.

3. The method of claim 1, wherein the sampled audio signal blocks are a trigger sequence.

4. The method of claim 1, wherein the plurality of energy values are determined using a frequency domain translated block of samples.

5. The method of claim 1, wherein the energy binning reduces a number of bins used to process each of the blocks of samples received.

6. The method of claim 1, wherein Mel-Frequency Cepstrum Coefficients (MFCCs) are determined using at least the energy binning.

7. The method of claim 6, wherein the MFCCs are exponentially normalized.

8. The method of claim 6, wherein the MFCCs are used at least in part to represent the training sequence.

9. The method of claim 6, wherein a distance is determined for the MFCCs, and wherein speech is present if the distance is less than a pre-determined threshold.

10. A system for voice trigger device wake up comprising:
an I/O processing unit, the I/O processing unit configured to:
receive an audio signal;
a core processing unit, the core processing unit configured to:
detect receipt of the audio signal that is sampled into blocks;
an overlap-add processing unit, the overlap-add processing unit configured to:
determine a plurality of energy values of the sampled audio signal blocks; the core processing unit further configured to:
perform energy binning of the plurality of energy values to determine whether speech is present in the sampled audio signal blocks;
determine that speech is present in the sampled audio signal blocks received;
match a trigger buffer to a training sequence stored in a training buffer in reverse of order received, wherein a representation of the sampled audio signal blocks is stored in the trigger buffer and wherein the match is performed starting with the representation of a most recently received audio signal matched to the most recently received of the training sequence that is stored in the training buffer; and
enable a wake up pin in a voice trigger device upon matching the trigger buffer to the training buffer.

11. The system of claim 10, wherein the overlap-add processing unit is a weighted overlap-add (WOLA) processor, and wherein the WOLA processor is configured to apply a window to the blocks of samples received.

12. The method of claim 11, wherein the WOLA processor translates the blocks of samples received into a frequency domain.

13. The system of claim 10, wherein the core processing unit is configured to reduce a number of bins used to process the blocks of samples received by performing the energy binning.

14. The system of claim 10, wherein Mel-Frequency Cepstrum Coefficients (MFCCs) are determined using at least the energy binning.

15. The system of claim 14, wherein the MFCCs are exponentially normalized.

16. The system of claim 14, wherein the MFCCs are used at least in part to represent the training sequence.

17. The system of claim 14, wherein the core processing unit is configured to determine a distance for the MFCCs, and wherein the core processing unit is further configured to determine that speech is present if the distance is less than a pre-determined threshold.

18. A non-transitory computer-readable data storage medium comprising instructions that, when executed by at least one processor of a device, cause the device to perform operations comprising:
detecting receipt of an audio signal that is sampled into blocks;
determining a plurality of energy values of the sampled audio signal blocks;
performing energy binning of the plurality of energy values to determine whether speech is present in the sampled audio signal blocks;
determining that speech is present in the sampled audio signal blocks received;
storing a representation of the sampled audio signal block in a trigger buffer;
matching the representation of the sampled audio signal blocks stored in the trigger buffer to a training sequence stored in a training buffer in reverse of order received wherein the matching proceeds from matching the representation of a most recent sampled audio signal to a most recently sampled of the training sequence; and
enabling a wake up pin in a voice trigger device upon matching the representation to the training sequence.

* * * * *